United States Patent [19]
Touro

[11] 3,962,402
[45] June 8, 1976

[54] OXIDATION-LEACHING OF CHALCOPYRITE

[75] Inventor: Freddie J. Touro, New Orleans, La.

[73] Assignee: Freeport Minerals Company, New York, N.Y.

[22] Filed: Feb. 27, 1974

[21] Appl. No.: 446,315

[52] U.S. Cl. .................................. 423/35; 423/41
[51] Int. Cl.² .......................................... C01G 3/10
[58] Field of Search ................... 423/27, 34, 35, 36, 423/41, 141; 75/108, 101 R, 117

[56] References Cited
UNITED STATES PATENTS

| | | | |
|---|---|---|---|
| 1,111,874 | 9/1914 | Vadner | 423/35 |
| 2,686,114 | 8/1954 | McGauley et al. | 423/35 |
| 2,718,455 | 9/1955 | McCormick | 423/141 |
| 2,805,936 | 9/1957 | Schaufelberger | 423/41 |
| 2,871,116 | 1/1959 | Clark | 75/108 |
| 2,971,835 | 2/1961 | Matson | 423/141 |
| 3,174,849 | 3/1965 | Mackiw et al. | 423/41 |
| 3,241,950 | 3/1966 | Mackiw et al. | 75/117 |
| 3,264,099 | 8/1966 | Johnson | 423/41 |
| 3,637,371 | 1/1972 | Mackiw et al. | 75/101 R |

OTHER PUBLICATIONS

Evans et al., Editors, International Symposium on Hydrometallurgy AIME, New York, 1973, pp. 375–402.

Primary Examiner—Oscar R. Vertiz
Assistant Examiner—Brian E. Hearn
Attorney, Agent, or Firm—Ronald A. Schapira

[57] ABSTRACT

A method is described for the oxidation-leaching of chalcopyrite concentrates at high temperatures and pressures for the extraction of copper values as copper sulfate in which temperatures are maintained between about 425° and 450°F, oxygen partial pressures of between about 50 and 200 psi are provided, and levels of acidity are permitted to increase above about 50 grams of $H_2SO_4$ per liter in order to obtain maximum rates of extraction of virtually all of the copper. Thereafter, while maintaining the temperature and pressure at elevated levels, the acidity of the slurry is reduced to between about 10 and 40 grams of $H_2SO_4$ per liter in order to obtain reduction of dissolved iron to optimal levels. The resulting slurry is then cooled and further processed for the production of a very pure copper sulfate solution.

4 Claims, 3 Drawing Figures

PERCENT COPPER EXTRACTION VERSUS OXIDATION-LEACHING RETENTION TIME FOR A COPPER SULFIDE CONCENTRATE AT 400°F., 200 psi OXYGEN PARTIAL PRESSURE, AND VARIOUS INITIAL ACID LEVELS EFFECT OF TEMPERATURE AND ACID LEVEL ON COPPER EXTRACTION DURING THE OXIDATION-LEACHING OF A COPPER SULFIDE CONCENTRATE (RETENTION TIMES ARE 15 MINUTES FOR THE 425°F. AND 400°F. RUNS AND 30 MINUTES FOR THE 375°F. RUN)

EQUILIBRIUM IRON CONCENTRATION VERSUS
FINAL ACID LEVEL IN COPPER SULFATE
SOLUTION AT VARIOUS TEMPERATURES

3,962,402

OXIDATION-LEACHING OF CHALCOPYRITE

BACKGROUND OF THE INVENTION

In the high pressure-high temperature oxidation-leaching of chalcopyrite ore concentrates the oxidation of the sulfides results in the formation of sulfuric acid, the dissolution of the water-soluble and acid-soluble metals, and the generation of heat due to the exothermic nature of the oxidation reactions. The oxidation reactions proceed according to the following equations:

1. 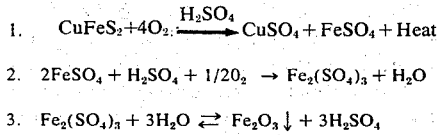

$$CuFeS_2 + 4O_2 \xrightarrow{H_2SO_4} CuSO_4 + FeSO_4 + \text{Heat}$$

2. $2FeSO_4 + H_2SO_4 + 1/2O_2 \rightarrow Fe_2(SO_4)_3 + H_2O$

3. $Fe_2(SO_4)_3 + 3H_2O \rightleftarrows Fe_2O_3 \downarrow + 3H_2SO_4$

Frequently, lime (CaO) or limestone ($CaCO_3$) is fed to the leaching autoclave to neutralize a portion of the acidity in order to precipitate arsenic or iron, or simply to reduce the acidity and adjust the pH as desired for subsequent steps of the process. Where lime is used, neutralization proceeds according to the equation:

4. 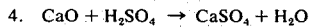

$CaO + H_2SO_4 \rightarrow CaSO_4 + H_2O$

Where limestone is used as the neutralizer, the reaction proceeds as follows:

5. 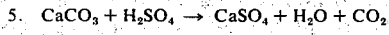

$CaCO_3 + H_2SO_4 \rightarrow CaSO_4 + H_2O + CO_2$

In accomplishing neutralization the extremely important economic consideration of operation at optimal metal extraction rates may well be overlooked or defeated by maintenance of acidity levels which are not commensurate with high extraction rates. In similar vein various means are resorted to for removal of the heat generated in order to avoid buildup of excessive internal pressures, etc. Here again the extent to which heat is removed in order to minimize pressure buildup will very likely not necessarily result in optimal temperatures for maximum copper extraction.

It is an object of this invention to provide a method of oxidation-leaching of chalcopyrite and other similar copper sulfide concentrates employing oxygen-containing gases which results in a maximum rate of copper extraction from the concentrate while extracting a maximum percentage of copper from the concentrate and at the same time retaining a minimum amount of dissolved iron in the resulting solution.

It is another object of this invention to provide a method of oxidation-leaching which simultaneously allows the maximum rate and percentage of copper extraction with minimum iron in solution and optimal composition of the precipitates produced for efficient liquid-solids separation at a later stage in the copper recovery process.

BRIEF SUMMARY OF THE INVENTION

The invention includes slurrying a chalcopyrite concentrate with water, dilute sulfuric acid, recycle process streams, or combinations thereof, and feeding the slurry into a pressurized vessel, such as an autoclave. Within the autoclave, in order to achieve maximum copper extraction rates, the slurry temperature is maintained between 425° and 450°F, the oxygen partial pressure is maintained between 50 and 200 psi, and the acidity is permitted to rise to maximum values, i.e., 50–100 grams of $H_2SO_4$ per liter. Subsequent to the extraction of more than about 90 percent of the copper in the slurried concentrate, a neutralizing agent is injected into the pressurized vessel to lower the acidity of the slurry to a level commensurate with optimal removal of iron from solution while maintaining the temperature and pressure at the stated levels. This results in optimal iron precipitate composition (hematite rather than hydrated iron oxide) and optimal calcium precipitate composition (anhydrite rather than gypsum). The slurry is then cooled and further processed for the recovery of the copper sulfate solution.

DETAILED DESCRIPTION

Figure 1:
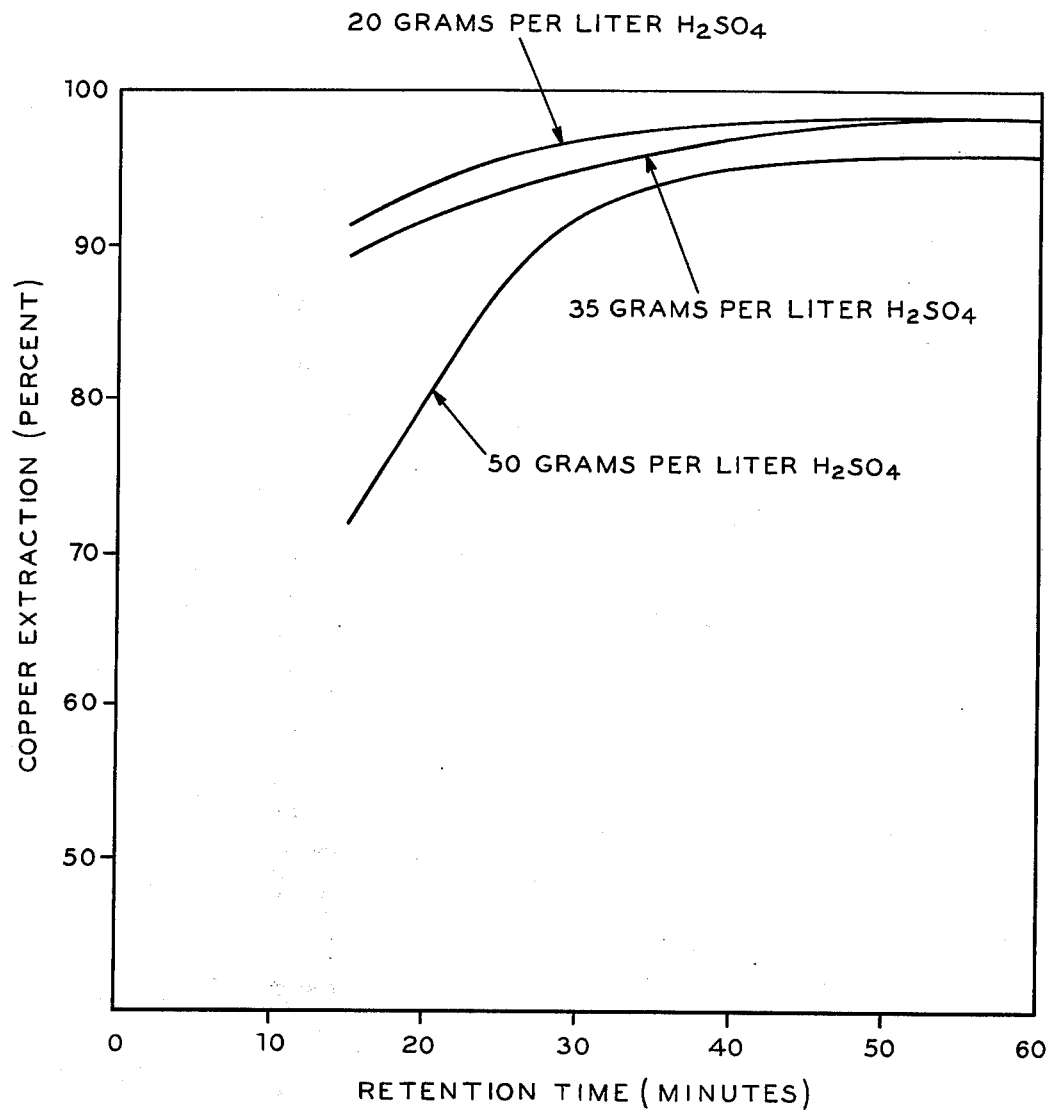
FIG. 1 is a chart showing percent copper extraction at 400°F and oxygen partial pressure of 200 pounds per square inch as a function of time at various acid levels.

In the preferred embodiment of the invention a chalcopyrite concentrate containing between about 20 and 35 percent copper is processed in an autoclave system of the type described in copending application for United States Letters Patent Ser. No. 446,412, filed 2/27/74 by Freddie J. Touro, the present inventor.

The copper level in the final treated solution is raised to at least about 60 grams per liter and may include dissolved copper from the copper concentrate and dissolved copper from recycle streams. In keeping with the preferred method of operation, an acid level of at least 50 grams per liter is maintained during the period in which copper is being extracted as copper sulfate. Acid is generated primarily by the oxidation of the concentrate, although some acid may be included in the recycle stream. In accordance with the method of the present invention the acid level is maintained at the stated level and is not neutralized until the copper extraction is substantially complete. Preferably, the temperature in the autoclave system is maintained at around 425°F. The oxygen partial pressure should be maintained at between about 50 and 200 pounds per square inch, which is equivalent to a total pressure of between about 350 and 600 psig. The oxygen partial pressure is preferably maintained at about 100 pounds per square inch.

While these initial conditions are optimal with regard to copper extraction rate, they are not optimal with regard to minimum iron content in the leach liquor. In order to reduce the amount of iron that is dissolved in the leach liquor it is necessary to lower the acidity of the solution by the addition of a neutralizing agent. Neutralizing agents that may be used for this purpose include the hydroxides, oxides and carbonates of calcium, strontium and barium. For economic considerations, limestone is normally preferred. The extent of neutralization desired is such as to provide a final acid concentration of 10 to 40 grams of $H_2SO_4$ per liter. This results in a final iron concentration in the leach liquor of from about 0.5 to 1.5 grams per liter.

In the preferred embodiment of the present invention, when limestone is used the neutralization of the acidity is carried out in an isolated compartment of an autoclave vessel of the type described in the abovementioned copending application Ser. No. 446,412 so that the $CO_2$ gas generated in the neutralization reactions will not mix with and dilute the oxygen atmosphere. The temperature range of from about 425° to 450°F for maximum copper extraction rate is highly satisfactory for the removal of iron from the leach liquor as an insoluble precipitate $Fe_2O_3$ (i.e., hematite), thus permitting both phases of the leaching process to be carried out in a common vessel rather than requiring the costlier use of multiple vessels.

EXAMPLES OF PRACTICE

The invention is further explained and illustrated by the following series of tests employing a copper sulfide concentrate of the following analysis:

Table No. 1

| Composition of the Feed Concentrate | |
|---|---|
| Cu | 33.6% |
| Fe | 19.2 |
| S | 29.7 |
| Zn | 0.054 |
| Mg | 0.12 |
| $CO_3$ | 0.19 |
| $SiO_2$ | 7.6 |

Three feed solutions, Nos. 1, 2 and 3 in Table 2, below, were prepared to simulate near-equilibrated concentrations in an autoclave. Solutions 1, 2 and 3, then, had initial sulfuric acid levels of 20, 35 and 50 grams per liter, as $H_2SO_4$, respectively, and ferric sulfate levels of 2.8, 4.8 and 6.8 grams per liter, as Fe, respectively. All three solutions contained copper sulfate at an initial concentration of 60 grams per liter, as copper. In each of these tests ten grams of the copper sulfide concentrate, containing 33.6% copper (see Table No. 1, above) were added to 500 milliliters of either solution No. 1, solution No. 2, or solution No. 3, and the resultant slurry charged into an autoclave. Upon oxidation, reaction of 90-plus percent of the 10 grams of copper sulfide concentrate added in each case results in the dissolution of about 3 grams of copper, or an additional 6 grams per liter, as copper, in solution, and in the formation of about 3.5 grams of sulfuric acid, or an additional 7 grams per liter, as $H_2SO_4$, in solution.

Table No. 2

| Feed Solutions | $H_2SO_4$ (grams per liter) | $Fe^{+3}$ (grams per liter) |
|---|---|---|
| Solution No. 1 | 20 | 2.8 |
| Solution No. 2 | 35 | 4.8 |
| Solution No. 3 | 50 | 6.8 |

In a typical run the 10 grams of concentrate and 500 milliliters of solution were charged into a 316 stainless steel 2 liter capacity autoclave vessel equipped with a titanium liner. After sealing the autoclave, the charge was heated up to the predetermined reaction temperature. A predetermined oxygen partial pressure was applied and maintained for the desired reaction time. Since the reaction is highly exothermic, cooling water was passed through internal coils to maintain the temperature within approximately ± 5°F of the predetermined temperature. Upon completion of the oxidation period, the oxygen supply was stopped and cooling was started immediately, resulting in a 75°F drop in less than one minute. After cooling, the charge was removed from the autoclave, the liquor and solids were separated, and the solids were washed and dried for analyses.

REACTION RATE TESTS
(BATCH-EQUILIBRATED TYPE)

Runs were conducted employing the three feed solutions shown in Table No. 2 with concentrate from Table No. 1 added as described at 400°F and an oxygen partial pressure of 200 psi (435 psig total pressure) for 15, 30 and 60 minutes retention time. FIG. 1 is a plot showing percent copper extraction at 400°F and an oxygen partial pressure of 200 pounds per square inch versus time at the various acid levels. In this particular series optimum copper extraction and rate of extraction occurred at the lower acid concentrations. This establishes that, at 400°F, high acidity is detrimental to optimal copper extraction.

Figure 2:
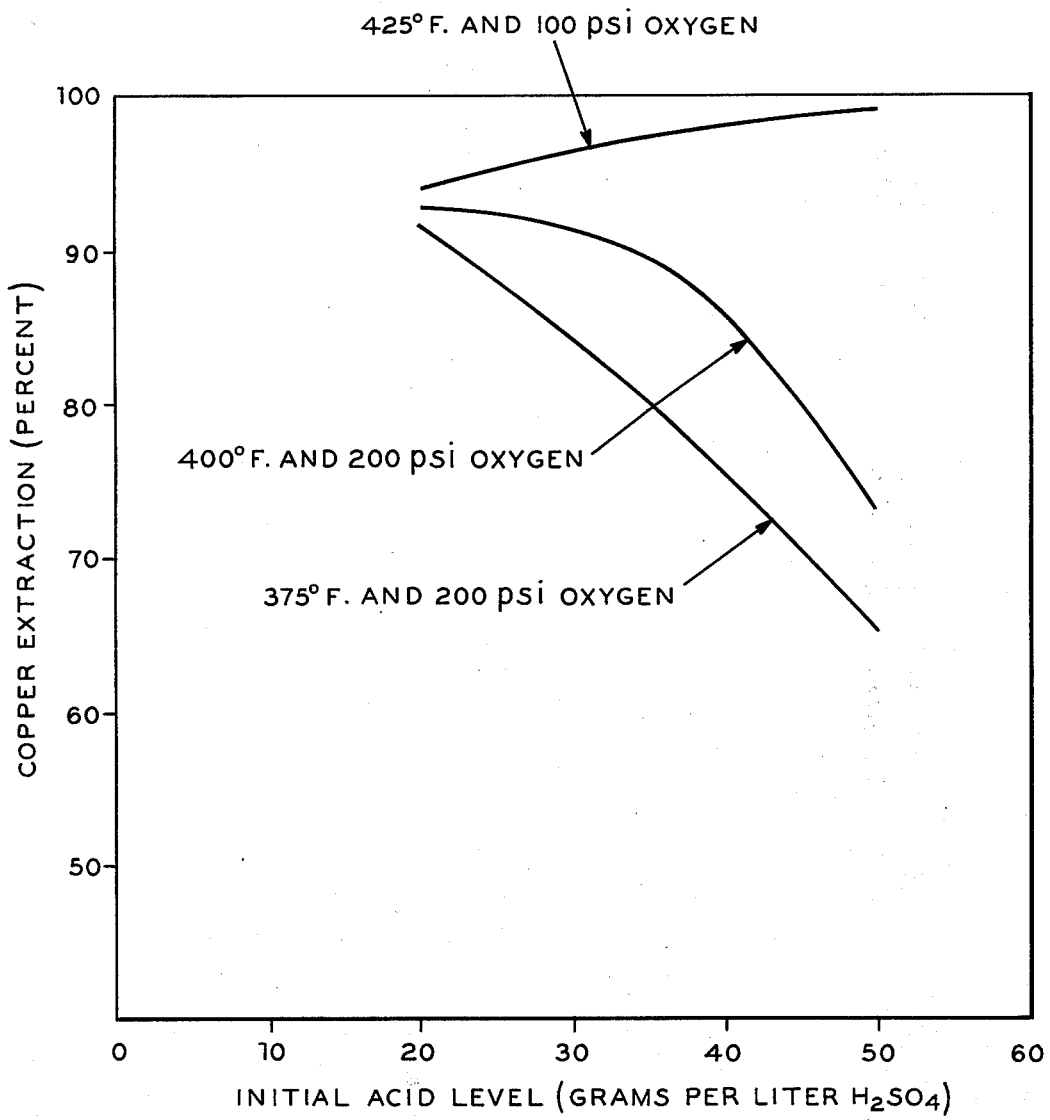
FIG. 2 is a chart showing the effect of temperature and initial acid level on the percent copper extraction.

In order to determine the effect of acid level and temperature on copper extraction, two series of tests were performed employing the three standard solutions of Table No. 2 to complement part of the 400°F test series. One series was run at 375°F with 200 psi oxygen partial pressure (370 psig total pressure) for 30 minutes and the other series was run at 425°F with 100 psi oxygen partial pressure (410 psig total pressure) for 15 minutes. FIG. 2 presents the results graphically: at a temperature of 425°F and high initial acid level maximum copper extraction is obtained in minimum time. This shows the beneficial effect of high acidity at 425°F, in contrast to the detrimental effect it has at 400°F and lower temperatures.

Two additional tests having only 5 minutes retention time were carried out at 425°F with 100 psi oxygen partial pressure. Feed solutions consisted of the standard $H_2SO_4$/Fe$^{+++}$ = 50/6.8 grams per liter (solution No. 3 from Table No. 2) for one run and the same standard solution plus ferric sulfate equivalent by hydrolysis to a total acid concentration of 90 grams per liter (50 acid plus 40 equivalent) for the other run. Copper extractions were 90% and 88% for the 50 grams per liter and 90 grams per liter solutions, respectively. It should be pointed out that the 5-minute period is an approximate time only and the actual time at 425°F with oxygen partial pressure of 100 psi was probably less than 5 minutes. However, the reaction rates obtained indicate that the oxidation-leaching of chalcopyrite is very fast around 425°F.

A temperature of 425°F with 100 psi oxygen partial pressure (410 psig total) is preferred to 400°F with 200 psi oxygen partial pressure (435 psig total) in order to obtain fast reaction rates as well as good copper extraction. Fluctuations in an actual operation dictate that a temperature range rather than a specific temperature be chosen. Therefore, a few tests were done at 450°F with 50 psi oxygen partial pressure (460 psig total) for five minutes retention. Feed solutions consisted of the 90 grams per liter equivalent $H_2SO_4$ as above for one test and 40 grams per liter equivalent $H_2SO_4$, added as ferric sulfate, for the other test. Copper extractions were 91 and 87%, respectively. A third run was carried out in a regular copper sulfate solution without initial free acid or ferric ions at 450°F with 50 psi oxygen partial pressure for 15 minutes. Copper extraction was 93% indicating that the high-temperature acid-neutralization step to be employed in a commercial plant directly following the oxidation-leaching stage should result in little or no copper losses even if the system is neutralized to 5–10 grams H₂SO₄ per liter.

Oxidation-leaching at 425°–450°F with 460 psig total pressure allows 110 to 55 psi oxygen partial pressure which appears to be sufficient to promote fast reaction rates. As shown in FIG. 2, batch reaction time for 98% copper extraction is only 15 minutes at 425°F with 100 psi oxygen partial pressure.

In order to confirm the effect of high acid levels at increased temperature (425°–450°F), relative extraction times required to obtain 92% copper extraction (expressed in approximate minutes) were derived employing data from various tests as needed. Initial reaction rates could not be obtained because of the fast rates and the nature of the tests, and final extraction rates were not accurately known because of the asymptotic approach to a final 97–99% extraction. Table No. 3 is a presentation which shows the relative extraction times as affected by acid level and operating temperature.

Table No. 3

RELATIVE EXTRACTION TIME TO REACH 92% COPPER EXTRACTION AT VARIOUS TEMPERATURES AND SULFURIC ACID LEVELS

| Temp. (°F) | Oxygen Partial Press. (psi) | Total Press. (psia) | Initial $H_2SO_4$ Conc. (gpl) | Relative Extraction Time (Min.) |
|---|---|---|---|---|
| 375 | 200 | 385 | 20 | 30 |
| 375 | 200 | 385 | 35 | 50 |
| 375 | 200 | 385 | 50 | 80 |
| 400 | 200 | 450 | 0* | 20 |
| 400 | 200 | 450 | 20 | 15 |
| 400 | 200 | 450 | 35 | 20 |
| 400 | 200 | 450 | 50 | 30 |
| 425 | 100 | 425 | 20 | 12 |
| 425 | 100 | 425 | 35 | 8 |
| 425 | 100 | 425 | 50 | 6 |
| 425 | 100 | 425 | 90 | 7 |
| 450 | 50 | 475 | 0* | 13 |
| 450 | 50 | 475 | 40 | 7 |
| 450 | 50 | 475 | 90 | 6 |

*Final $H_2SO_4$ = 7 gpl generated by the reaction. (Final $H_2SO_4$ = Initial $H_2SO_2$ plus 7 gpl.)

IRON CONCENTRATION VERSUS ACIDITY AND TEMPERATURE

Figure 3:
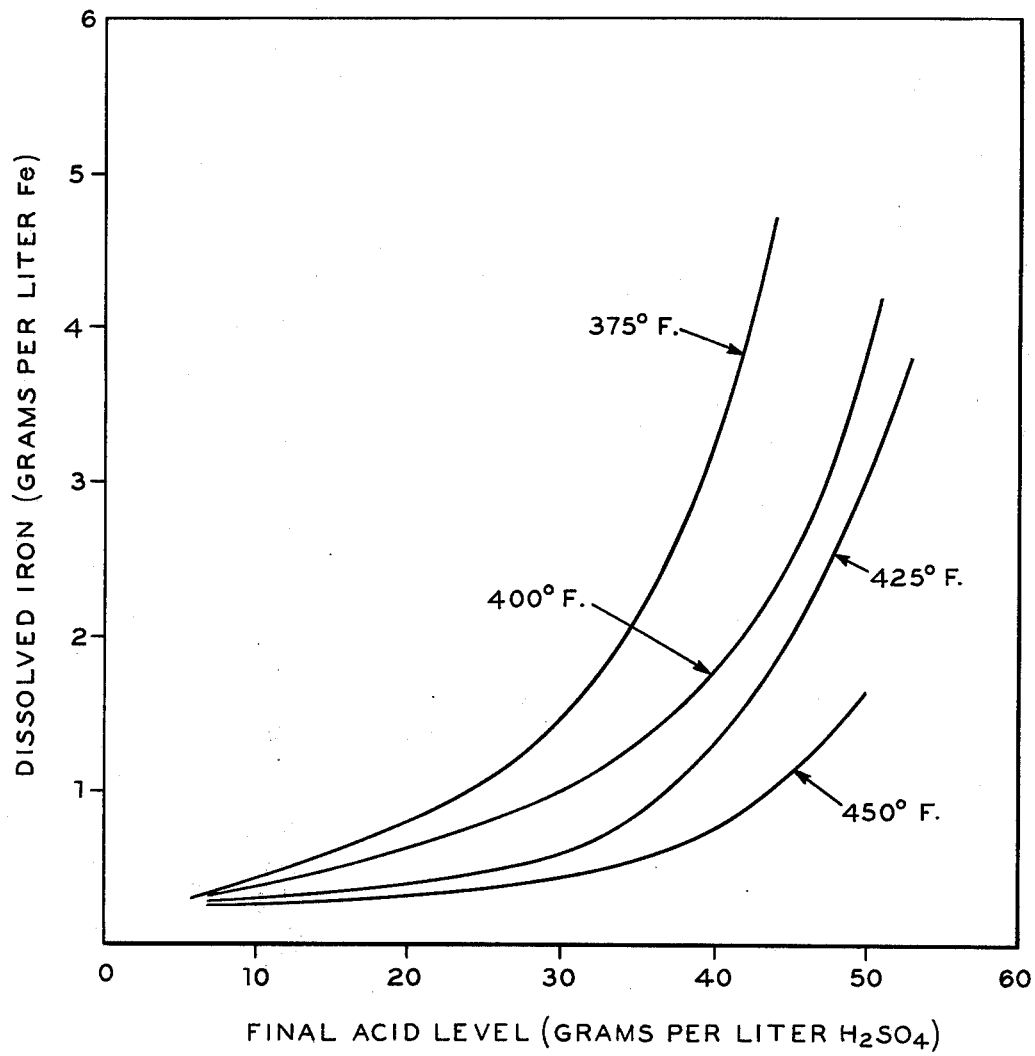
FIG. 3 shows the equilibrium iron concentration at various slurry temperatures and various final acid concentrations.

Iron concentration in the leach liquor is a function of the final acid concentration at a given temperature. To lower the iron concentration in an actual operation, some of the acid must be neutralized. FIG. 3 shows the equilibrium iron concentration obtained in a series of laboratory autoclave tests carried out at various slurry temperatures and various final acid concentrations. In this particular series of tests chalcopyrite concentrate, water, and oxygen were fed to the autoclave to produce 60 grams per liter of copper. Lime (CaO) was used to adjust the acid concentration.

FIG. 3 shows, for example, that at 425°F the amount of dissolved iron in the leach liquor is less than about 1.5 grams per liter where the final acid level is below about 40 grams per liter H₂SO₄. As the acid level is further reduced the amount of dissolved iron is also reduced. At a final acid level of 10 grams per liter H₂SO₄ the amount of dissolved iron in the treated slurry is less than about 0.5 grams per liter.

The terms and expressions which have been used here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A process for the oxidation-leaching of chalcopyrite to produce a leach liquor containing at least about 87% of the copper in the chalcopyrite but less than 1.5 grams of iron per liter, comprising:

introducing an aqueous slurry of chalcopyrite ore concentrate into an autoclave;

treating, for approximately 5 to 15 minutes, the slurry in said autoclave at a temperature of about 425° to 450°F. and at an oxygen partial pressure of about 50 to 200 pounds per square inch while increasing the acid concentration of the slurry to a value in excess of about 50 grams of H₂SO₄ per liter until at least about 87% of the copper in the concentrate is extracted as copper sulfate, the slurry having a dissolved iron concentration greater than about 1.5 grams per liter at the completion of the treatment; and then, reducing the acid concentration of the slurry to a final acid concentration of 10 to 40 grams of H₂SO₄ per liter while it is still present in the autoclave and at a temperature of about 425° to 450°F. and an oxygen partial pressure of about 50 to 200 pounds per square inch, whereby iron is precipitated in the form of Fe₂O₃.

2. The process of claim 1 wherein the oxygen partial pressure is about 100 pounds per square inch.

3. The process of claim 1 wherein the acid concentration of the slurry is increased to between about 50 and 100 grams of H₂SO₄ per liter.

4. A process as defined in claim 1 wherein said slurry is treated for about 6 to 13 minutes.

* * * * *